May 4, 1965 F. M. DU BOIS, JR., ETAL 3,182,215
DYNAMOELECTRIC MACHINE WITH PERMANENT MAGNET FIELD ASSEMBLY
Filed Feb. 6, 1961
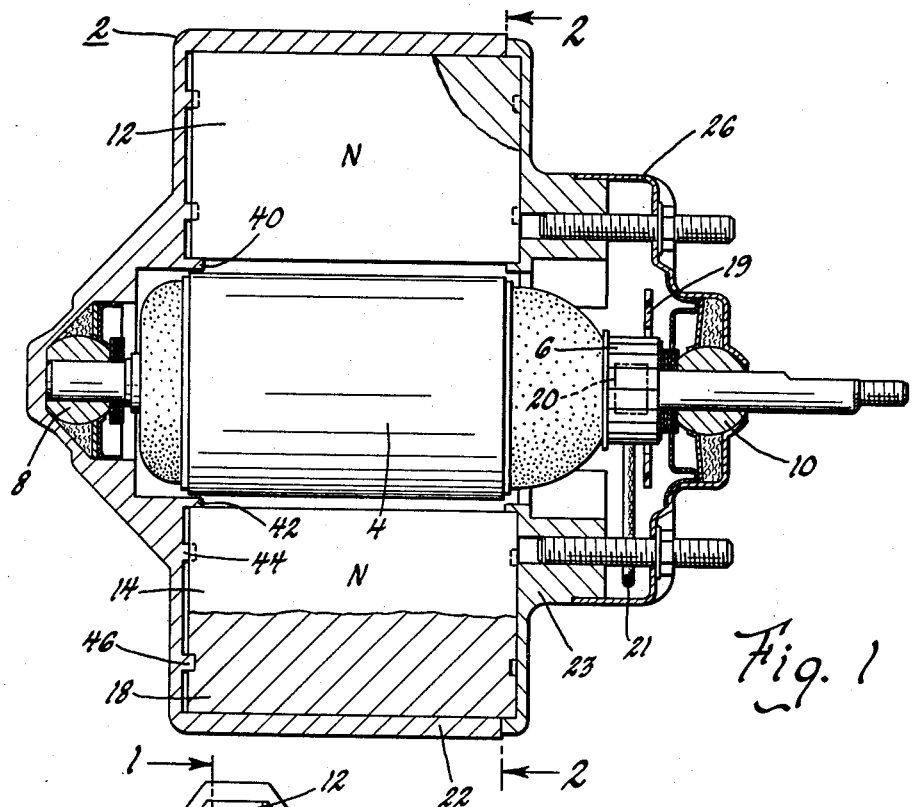
INVENTORS
Floyd M. DuBois, Jr.
Milton E. Simmons
BY Paul J. Rising
THEIR ATTORNEY United States Patent Office 3,182,215
Patented May 4, 1965

3,182,215
DYNAMOELECTRIC MACHINE WITH PERMANENT MAGNET FIELD ASSEMBLY
Floyd M. Du Bois, Jr., Lyons, and Milton E. Simmons, Rochester, N.Y., assignors to General Motors Corporation, Detroit, Mich., a corporation of Delaware
Filed Feb. 6, 1961, Ser. No. 87,346
5 Claims. (Cl. 310—154)

The present invention relates to rotary electrical equipment, such as electric motors and generators, and has as its principal object the provision of an improved permanent magnet-type field assembly for such equipment. More specifically, it is an object of the invention to provide a dynamo-electric machine having improved field structure embodying ferrite-type permanent magnets. Still another object is the provision of improved low cost means for retaining the field in assembled relationship with the motor or generator housing.

Briefly, the invention comprehends a dynamoelectric machine which includes a pair of ferrite permanent magnets and a pair of arcuate-shaped iron pole pieces arranged alternately in abutting end-to-end relationship in such a manner that there is optimum utilization of the magnetic flux of the ferrite magnets. The structure is particularly suited to the use of high energy barium ferrite magnets, commonly referred to as "oriented" barium ferrite magnets, which are generally manufactured only in flat shapes.

The above and other objects, features and advantages of the invention will appear more clearly from the following detailed description of a preferred embodiment thereof made with reference to the accompanying drawings in which:

FIGURE 1 is a side view in partial section of a D.C. electric motor embodying the invention;

FIGURE 2 is a view taken on the line 2—2 of FIGURE 1;

FIGURE 3 is a view taken on the line 3—3 of FIGURE 2; and

FIGURE 4 is a perspective view of the clip shown in FIGURE 3.

With reference now to the drawings, the electric motor includes a housing 2 which can be of die cast aluminum construction, an armature 4 with its associated commutator 6 rotatably supported in the housing by bearings 8 and 10, and a field assembly which includes a pair of permanent magnets 12 and 14 of oriented ferrite material and a pair of iron pole pieces 16 and 18. The armature, commutator and bearings as well as the brush support plate 19, the brushes, one of which is shown at 20 and the electric leads to the brushes, one of which is shown at 21, can be of conventional construction, the details of these components forming no part of the present invention.

In the embodiment shown, the housing 2 has three portions: a rear portion which encloses and supports rear bearing 8, a front cylindrical portion which serves as a cover for the commutator and brush assembly, and an intermediate portion of oval-shaped cross section which encloses and supports the field assembly. As shown in FIGURE 1, the housing is formed by two die castings 22 and 23 secured together by self-tapping screws 25 (see FIGURE 2) and by a sheet metal cup 26 secured by bolts to the die casting 23 which serves as the end plate of the oval-shaped housing portion.

In accordance with the invention, the magnets 12 and 14, which are of a ferrite permanent magnet material, are of flat rectangular shape, or of generally rectangular prism configuration and are arranged to extend radially outwardly with respect to the armature; in the embodiment shown they are positioned vertically above and below the armature 4. Each of the magnets is magnetized in the direction of its minimum thickness or, in other words, transverse to the extension of the armature radius on which the magnet lies, this being shown in FIGURE 2 wherein the poles are designated N and S for north and south. Hence, the flat rectangular surfaces of the magnets 12 and 14, as seen in FIGURE 1, constitute the north poles and the oppositely disposed flat rectangular surfaces constitute the south poles as can be seen in FIGURE 2.

Each of the pole pieces is of generally semi-oval shaped cross section with a cylindrical inner surface 27 and a cylindrical outer surface 28, the radius of the curvature of the outer surface being considerably larger than that of the inner surface. These cylindrical surfaces are joined by flat rectangular-shaped end surfaces 30 and 32 which lie in the same plane with each other and are of substantially the same size and shape as the pole surfaces of the magnets. The two pole pieces are assembled with the two magnets in alternate end-to-end relationship such that each of the magnets is pressed between and in abutting relationship with a pair of the opposed flat end surfaces of the pole pieces. Hence, in their assembled relationship, the magnets 12 and 14 and the pole pieces 16 and 18 form a field of generally oval-shaped cross section with a cylindrical bore to accommodate the armature 4. We have found that by so constructing the field, with the flat rectangular-shaped ferrite magnets oriented radially with respect to the armature and with arcuate pole pieces having flat end surfaces abutting the flat surfaces of the magnets, there is optimum utilization of the particular magnetic properties of oriented ferrite-type permanent magnets.

The term "ferrite magnets" is intended to comprehend magnets of any of the ferrite materials which display the properties of a permanent magnet, for example, the alkaline earth ferrites having an iron oxide-to-alkaline earth oxide ratio on the order of 6 to 1. In the preferred embodiment shown, the magnets 12 and 14 consist of oriented barium ferrite and are, as stated above, permanently magnetized in the direction of their minimum thickness.

To retain the field structure in fixed assembled relationship within the oval-shaped housing, the rear end wall of the housing is provided with a pair of inwardly extending lugs 40 and 42 and a plurality of parallel ridges, two of which are designated 44 and 46. The permanent magnets 12 and 14 are supported between the outer wall of the housing and the lugs 40 and 42 respectively, and the pole pieces are provided with a plurality of parallel grooves which are in mating engagement with the ridges on the rear wall of the housing. Hence, the lugs together with the arrangement of ridges and grooves maintain the field assembly in fixed orientation within the housing. Further, in order to take up any tolerance between the housing and the field structure and thereby prevent any movement of the field structure within the housing due to vibration, there is wedged between each of the pole pieces and the interior wall of the housing a pair of spring clips 48 and 50, one of which is shown in FIGURE 4. Each of these spring clips is of L-shaped sheet metal construction with a pair of out-struck spring tabs 52 and 54 in the longer leg thereof. The inner wall of the housing is formed with shallow slots, two of which are shown at 56 and 58, to accommodate the clips. After the field is assembled properly within the housing, the spring clips are merely shoved into the slots such that the out-struck portions form a spring wedge between the housing and the field assembly, this as in FIGURE 3. In order that the two pole pieces be interchangeable, it is desirable that they be formed with the grooves on both end surfaces. Also, while not essential it is desirable from the functional as well as the manufacturing standpoint that the pole pieces be of sintered iron construction.

It will be understood that while the invention has been described in detail by reference to a particular and preferred embodiment thereof, various changes and alterations may be made all within the full and intended scope of the claims which follow.

We claim:

1. A dynamoelectric machine comprising a housing, an armature rotatably supported in said housing and a field assembly in said housing surrounding said armature, said field assembly including a plurality of flat ferrite magnets of generally rectangular prism configuration comprising elongated narrow edge portions which extend radially outward with respect to said armature and in alignment with each other and a plurality of arcuate-shaped pole pieces each with a pair of relatively wide flat end surfaces extending the length of the armature whereby the pole flux emanates from the entire flat wide surfaces, each of said magnets being positioned between and in abutting relationship with opposed flat end surfaces of a pair of said pole pieces and being magnetized in a direction perpendicular to said opposed flat end surfaces.

2. A dynamoelectric machine comprising a housing of generally oval-shaped cross section, an armature rotatably supported in said housing and a field assembly of generally oval-shaped cross section in said housing surrounding said armature, said field assembly including a pair of flat ferrite magnets of generally rectangular prism configuration comprising elongated narrow edge portions which extend radially outward with respect to said armature and in alignment with each other and a pair of arcuate-shaped iron pole pieces each with relatively wide flat end surfaces extending the length of the armature and lying in the same plane whereby the pole flux emanates from the entire flat wide surfaces, each of said magnets being positioned between and in continuous abutting relationship with opposed flat end surfaces of said pair of pole pieces and being magnetized in a direction perpendicular to said opposed flat end surfaces.

3. A dynamoelectric machine comprising a housing, an armature rotatably supported in said housing, a field assembly in said housing surrounding said armature and including a plurality of permanent magnets of generally rectangular prism configuration comprising elongated narrow edge portions which extend radially outward and are magnetized in a direction perpendicular to the planes of its two opposed surfaces and a plurality of arcuate-shaped pole pieces each with a pair of relatively wide flat end surfaces extending the length of the armature whereby the pole flux emanates from the entire flat wide surface, said magnets and pole pieces being arranged in alternate end to end abutting relationship and defining a substantially cylindrical opening therethrough, and means maintaining said field assembly in fixed position within said housing, said means including a plurality of spring clips wedged at spaced points between said assembly and said housing.

4. In a dynamoelectric machine comprising a housing, and a field assembly in said housing which includes a plurality of permanent magnets of generally rectangular prism configuration comprising elongated narrow edge portions which extend radially outward and are magnetized in a direction perpendicular to the planes of two of its opposed surfaces and a plurality of arcuate-shaped pole pieces each with a pair of relatively wide flat end surfaces extending the length of the armature whereby the pole flux emanates from the entire flat wide surface, said magnets on said pole pieces being arranged in alternate end to end abutting relationship and defining a substantially cylindrical opening therethrough, means for maintaining said field assembly in fixed position within said housing, said means including a plurality of mating raised portions and depressions between the surfaces of the field assembly and the interior surface of said housing.

5. An electric motor comprising a housing having a portion of generally oval-shaped cross section, an armature rotatably supported in said housing, a field assembly of generally oval-shaped cross section in said housing surrounding said armature, said field assembly including a pair of flat oriented barium ferrite magnets of generally rectangular prism configuration comprising elongated narrow edge portions extending radially outward with respect to said armature and a pair of pole pieces of arcuate-shape cross section each with an external radius of curvature larger than its internal radius of curvature and with a pair of equally sized rectangular-shaped flat relatively wide end surfaces extending the length of the armature and lying in the same plane whereby the pole flux emanates from the entire flat wide surfaces, each of said magnets being positioned between and in continuous abutting relationship with opposed flat end surfaces of said pair of pole pieces and being magnetized in a direction perpendicular to said opposed flat end surfaces, and means retaining said field assembly in fixed position in said housing including a plurality of ridges on the inner wall of said housing in mating engagement with grooves in said pole pieces and a plurality of spaced spring clips wedged between said housing and said pole pieces.

References Cited by the Examiner

UNITED STATES PATENTS

| | | | |
|---|---|---|---|
| 1,098,753 | 6/14 | Podlesak | 310—154 |
| 1,379,953 | 5/21 | Andreino | 310—254 |
| 1,422,154 | 7/22 | Watson | 310—254 |
| 1,457,463 | 6/23 | Schwarzmann | 310—254 |
| 2,048,161 | 7/36 | Klaiber | 310—154 |
| 2,325,915 | 8/43 | Naul | 310—254 |
| 2,482,875 | 9/49 | Sawyer | 310—154 X |
| 2,513,226 | 6/50 | Wylie | 310—154 |
| 2,717,969 | 9/55 | Buchhold et al. | 310—154 X |
| 2,830,207 | 4/58 | Clark | 310—154 |
| 2,856,573 | 10/58 | Williams et al. | 310—211 X |

MILTON O. HIRSHFIELD, *Primary Examiner*.